US010235539B2

(12) United States Patent
Ito et al.

(10) Patent No.: US 10,235,539 B2
(45) Date of Patent: Mar. 19, 2019

(54) SERVER DEVICE, RECORDING MEDIUM, AND CONCEALED SEARCH SYSTEM

(71) Applicants: Takashi Ito, Tokyo (JP); Nori Matsuda, Tokyo (JP); Mitsuhiro Hattori, Tokyo (JP); Takumi Mori, Tokyo (JP); Takato Hirano, Tokyo (JP)

(72) Inventors: Takashi Ito, Tokyo (JP); Nori Matsuda, Tokyo (JP); Mitsuhiro Hattori, Tokyo (JP); Takumi Mori, Tokyo (JP); Takato Hirano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 490 days.

(21) Appl. No.: 14/765,050

(22) PCT Filed: Feb. 25, 2013

(86) PCT No.: PCT/JP2013/054735
§ 371 (c)(1),
(2) Date: Jul. 31, 2015

(87) PCT Pub. No.: WO2014/128958
PCT Pub. Date: Aug. 28, 2014

(65) Prior Publication Data
US 2015/0371062 A1 Dec. 24, 2015

(51) Int. Cl.
*G06F 21/00* (2013.01)
*G06F 21/72* (2013.01)
(Continued)

(52) U.S. Cl.
CPC ............. *G06F 21/72* (2013.01); *G06F 21/62* (2013.01); *G06F 21/6245* (2013.01); *G09C 1/00* (2013.01); *H04L 9/30* (2013.01)

(58) Field of Classification Search
CPC ... H04L 9/16; H04L 9/30; G06F 21/72; G06F 21/6245; G06F 21/62; G09C 1/00
See application file for complete search history.

(56) References Cited

U.S. PATENT DOCUMENTS

| 5,991,414 A | 11/1999 | Garay et al. |
| 6,519,700 B1 | 2/2003 | Ram et al. |
(Continued)

FOREIGN PATENT DOCUMENTS

| EP | 1 225 500 A2 | 7/2002 |
| EP | 1 225 500 A3 | 7/2002 |
(Continued)

OTHER PUBLICATIONS

Extended European Search Report dated Sep. 26, 2016 in Patent Application No. 13875718.2.
(Continued)

*Primary Examiner* — John B King
(74) *Attorney, Agent, or Firm* — Oblon, McClelland, Maier & Neustadt, L.L.P.

(57) ABSTRACT

A server device 201 comprises a communication part 231, a search history storage region 213, a data storage part 210, and a checking part 220. The communication part receives a set of a trapdoor and a deterministic encrypted keyword from a search device 401. The search history storage region 213 stores the set of the trapdoor and the deterministic encrypted keyword. The data storage part 210 stores keyword information in which search target data and an encrypted keyword are associated with each other. If the deterministic encrypted keyword is obvious, a deterministic encrypted keyword corresponding to the encrypted keyword is additionally associated with the search target data and the encrypted keyword in the keyword information. The checking part 220 checks whether or not a deterministic encrypted keyword which matches the received deterministic
(Continued)

encrypted keyword exists in the search history storage region 213. If the deterministic encrypted keyword exists, the checking part 220 executes a concealed search targeting the data storage part 210, based on a deterministic encryption scheme using the deterministic encrypted keyword existing in the search history storage region 213. If the deterministic encrypted keyword does not exist, the checking part 220 executes the concealed search targeting the data storage part 210, based on a probabilistic encryption scheme using the received trapdoor and the encrypted keyword stored in the data storage part 210.

9 Claims, 18 Drawing Sheets

(51) Int. Cl.
*G06F 21/62* (2013.01)
*G09C 1/00* (2006.01)
*H04L 9/30* (2006.01)

(56) References Cited

U.S. PATENT DOCUMENTS

| | | | |
|---|---|---|---|
| 6,763,464 | B2 | 7/2004 | Wang et al. |
| 7,068,787 | B1 | 6/2006 | Ta et al. |
| 7,171,557 | B2 | 1/2007 | Kallahalla et al. |
| 8,615,668 | B2 | 12/2013 | Matsuda et al. |
| 8,995,665 | B1 | 3/2015 | Tsaur et al. |
| 2003/0081784 | A1 | 5/2003 | Kallahalla et al. |
| 2005/0004924 | A1* | 1/2005 | Baldwin .......... G06F 17/30327 |
| 2005/0138393 | A1 | 6/2005 | Challener et al. |
| 2005/0271246 | A1 | 12/2005 | Sharma et al. |
| 2009/0094200 | A1* | 4/2009 | Baeza-Yates ..... G06F 17/30902 |
| 2010/0142710 | A1 | 6/2010 | Chrysler et al. |
| 2010/0246827 | A1 | 9/2010 | Lauter et al. |
| 2012/0159180 | A1* | 6/2012 | Chase ................ G06F 21/6227 713/183 |
| 2013/0067226 | A1 | 3/2013 | Kunde et al. |
| 2013/0191650 | A1* | 7/2013 | Balakrishnan ...... G06F 21/6227 713/190 |
| 2013/0262863 | A1* | 10/2013 | Yoshino .................. H04L 9/008 713/165 |
| 2013/0287206 | A1 | 10/2013 | Hattori et al. |
| 2013/0287210 | A1 | 10/2013 | Matsuda et al. |
| 2013/0318351 | A1 | 11/2013 | Hirano et al. |
| 2014/0019454 | A1* | 1/2014 | Carter .............. G06F 17/30457 707/741 |
| 2014/0247939 | A1 | 9/2014 | Hattori et al. |
| 2014/0298009 | A1 | 10/2014 | Hattori et al. |
| 2015/0207782 | A1 | 7/2015 | Hattori et al. |

FOREIGN PATENT DOCUMENTS

| | | |
|---|---|---|
| JP | 2000-11001 | 1/2000 |
| JP | 2000-011001 A | 1/2000 |
| JP | 2001-7802 | 1/2001 |
| JP | 2001-007802 A | 1/2001 |
| JP | 2002-44072 A | 2/2002 |
| JP | 2003-178070 | 6/2003 |
| JP | 2003-178070 A | 6/2003 |
| JP | 2005-134990 | 5/2005 |
| JP | 2005-134990 A | 5/2005 |
| JP | 2005-284915 | 10/2005 |
| JP | 2005-284915 A | 10/2005 |
| JP | 2006-210964 | 8/2006 |
| JP | 2006-210964 A | 8/2006 |
| JP | 2006-262333 | 9/2006 |
| JP | 2006-262333 A | 9/2006 |
| JP | 2007-52698 | 3/2007 |
| JP | 2007-052698 A | 3/2007 |
| JP | 2007-293807 | 11/2007 |
| JP | 2007-293807 A | 11/2007 |
| JP | 2008-97438 | 4/2008 |
| JP | 2008-097438 A | 4/2008 |
| JP | 2008-521025 | 6/2008 |
| JP | 2008-521025 A | 6/2008 |
| JP | 2009-129210 | 6/2009 |
| JP | 2009-129210 A | 6/2009 |
| JP | WO 2010/070787 A1 | 6/2010 |
| JP | 2010-160235 | 7/2010 |
| JP | 2010-160235 A | 7/2010 |
| JP | 2010-165275 | 7/2010 |
| JP | 2010-165275 A | 7/2010 |
| JP | WO 2010/125653 A1 | 11/2010 |
| JP | WO 2011/052056 A1 | 5/2011 |
| JP | 2011-147074 | 7/2011 |
| JP | 2011-147074 A | 7/2011 |
| JP | WO 2011/086668 A1 | 7/2011 |
| JP | WO 2011/086687 A1 | 7/2011 |
| JP | 2011-198079 A | 10/2011 |
| JP | 2011-211593 | 10/2011 |
| JP | 2011-211593 A | 10/2011 |
| JP | 2012-83863 A | 4/2012 |
| JP | 2012-164031 A | 8/2012 |
| WO | WO 2006/054208 A1 | 5/2006 |
| WO | WO 2010/070787 A1 | 6/2010 |
| WO | WO 2010/125653 A1 | 11/2010 |
| WO | WO 2011/052056 A1 | 5/2011 |
| WO | WO 2011/086668 A1 | 7/2011 |
| WO | WO 2011/086687 A1 | 7/2011 |
| WO | WO 2012/095973 A1 | 7/2012 |

OTHER PUBLICATIONS

Dan Boneh, et al., "Public Key Encryption with Keyword Search" International Association for Cryptologic Research, vol. 20040325:014738, XP061000696, Mar. 25, 2004, pp. 1-15.

Michael Schrefl, et al., "SemCrypt—Ensuring Privacy of Electronic Documents Through Semantic-Based Encrypted Query Processing" Proceedings of the 21$^{st}$ International Conference on Data Engineering (ICDE '05), XP010924094, Apr. 5, 2005, 10 Pages.

Zhiqiang Yang, et al., "Privacy-Preserving Queries on Encrypted Data" Computer Security—Esorics 2006, vol. 4189, XP019043217, Jan. 1, 2006, pp. 479-495.

International Search Report dated May 7, 2013, in PCT/JP2013/054735, filed Feb. 25, 2013.

Takanori Suga, et al., "Security of Searchable Encryption Revisited", Computer Security Symposium, vol. 2011, No. 3, Oct. 19-21, 2011, pp. 125-130.

JP Office Action dated Apr. 15, 2014 in Application No. 2013-546896 with English translation, 19 pages.

International Search Report issued in International application No. PCT/JP2012/051533, 2 pages.

Philippe Golle, et al., Universal—Re-encryption for Mixnets, T. Okamot (Ed.): CT-RSA 2004, LNCS 2964, pp. 163-178, 2004 © Springer-Verag Berlin Heidelberg 2004, 18 pages.

U.S. Non-Final Office Action dated Sep. 15, 2015 issued in co-pending U.S. Appl. No. 14/350,740, 9 pages.

U.S. Final Office Action dated Apr. 4, 2016 issued in co-pending U.S. Appl. No. 14/350,740, 10 pages.

CN First Office Action dated Nov. 2. 2016 in Application No. 201280068055.5 with English translation, 19 pages.

JP Office Action dated Apr. 26, 2014 in Application No. 2013-546896 with English translation, 3 pages.

CN Second Office Action dated Feb. 24. 2017 in Application No. 201280068055.5 with English translation, 19 pages.

Extended European Search Report dated Dec. 18, 2015 issued in Application No. 12866425.7-1870/2808803 PCT/JP2012051533. 9 pages.

U.S. Non-Final Office Action dated Mar. 26, 2015 issued in co-pending U.S. Appl. No. 14/350,987, 21 pages.

U.S. Non-Final Office Action dated Jul. 17, 2015 issued in co-pending U.S. Appl. No. 14/350,987, 14 pages.

U.S. Final Office Action dated Nov. 27, 2015 in co-pending U.S. Appl. No. 14/350,987, 14 pages.

(56) References Cited

OTHER PUBLICATIONS

Michel Abdalla, et al., Searchable Encryption Revisited: Consistency Properties. Relation to Anonymous IBE, and Extensions, Jul. 2005, 43 pages, An extended abstract of this paper appears in Victor Shoup, editor, Advances in Cryptology {CRYPTO 2005, vol. 3621 of Lecture Notes in Computer Science, pp. 205{222, Santa Barbara, California, Aug. 14 { 18, 2005. Springer-Verlag, Berlin, Germany.
M.Bellare, et al., "Key-Privacy in Public-Key Encryption", Sep. 2001, 30 pages. An extended abstract of this paper appears in *Advances in Cryptology* { *ASIACRYPT* '01, Lecture Notes in Computer Science vol. 2248, C. Boyd ed., Springer-Verlag, 2001.
D.Boneh, et al., "Public Key Encryption with keyword Search", 15 pages.
D.Boneh, et al., "Identity-Based Encryption from the Weil Pairing", Appears in SIAM J. of Computing, vol. 32. No. 3, pp. 586-615, 2003. An extended abstract of this paper appears in the Proceedings of Crypto 2001, vol. 2139 of Lecture Notes in Computer Science, pp. 213-229 (31 pages), Springer-Verlag, 2001.
D.Boneh, et al., Evaluating 2-DNF Formulas on Ciphertexts, Apr. 2, 2006, 16 pages.
Xavier Boyen, et al., Anonymous Hierarchical Identity-Based Encryption (Without Random Oracles), Jun. 8, 2006. 30 pages.
David Freeman, et al., "A Taxonomy of Pairing-Friendly Elliptic Curves", 53 pages.
Craig Gentry, "Fully Homomorphic Encryption Using Ideal Lattices", *STOC* '09, May 31-Jun. 2. 2009, Bethesda, Maryland, USA. Copyright 2009 ACM 978-1-60558-506—Feb. 9, 2005, 10 pages.
Philippe Golle, et al., Uniersal—Re-encryption for Mixnets, T. Okamot (Ed.): CT-RSA 2004, LNCS 2964, pp. 163-178, 2004 © Springer-Verag Berlin Heidelberg 2004, 18 pages.
Mitsuhrio Hattori, et al., "Secure Biometric Authentication Using 2-DNF Homomorphic Encryption", The Institute of Electronics, Information and Communication Engineers, IEICE Technical Report ISEC2009-68 LOIS2009-57 (Nov. 2009), 9 pages.
Takato Hirano, et al., "Homomorphic Encryption Based Countermeasure against Active Attacks in Privacy-Preserving Biometric Authenticaton", The Institute of Electronics, Information and Communication Engineers, Technical Report of IEICE, 8 pages.
International Search Report issued in International application No. PCT/JP2011/077623, 2 pages.
International Search Report issued in International application No. PCT/JP2012/05153, 2 pages.
Jonathan Katz, et al., Predicate Encryption Supporting Disjunctions, Polynomial Equations, and Inner Products, 28 pages.
This is a Chapter from the Handbook of Applied Cryptography, by A. Menezes, P. van Oorschot, and S. Vanstone, CRC Press, 1996. For further information, see www.cacr.math.uwaterloo.ca/hac, 38 pages.
Tatsuaki Okamoto, et al., "Homomorphic Encryption and Signatures from Vector Decomposition", S.D. Galbraith and K.G. Paterson (Eds.): Pairing 2008, LNCS 5209, pp. 57-74. 2008. © Spinger-Verlag Berlin Heidelberg 2008, 18 pages.
Tatsuaki Okamoto, et al., Adaptively Attribute-Hiding (Hierarchical) Inner Product Encryption, Oct. 4, 2011. 33 pages.
European Office Action dated Aug. 2, 2017 in European Patent Application No. 13 875 718.2.
U.S. Appl. No. 15/984,468, filed Jan. 25, 2012, Mitsuhiro Hattori.
Summons to attend oral proceedings pursuant to Rule 115(1)EPC issued Jun. 4, 2018 in Application No. 13875718.2-1218/2960808, 8 pages.
India Office Action date of dispatch Nov. 26, 2018 on Application No. 4372/CHENP/2014, 6 pages.

\* cited by examiner

Fig. 5

| ENCRYPTED KEYWORD STORAGE REGION 211 | | |
|---|---|---|
| ENCRYPTED KEYWORD | DETERMINISTIC ENCRYPTED KEYWORD | DATA ID |
| $c_1$ | | $id_1$ |
| $c_2$ | | $id_2$ |
| $c_3$ | | $id_3$ |
| $c_4$ | | $id_4$ |
| $c_5$ | | $id_5$ |
| ⋮ | | ⋮ |
| ⋮ | | ⋮ |

Fig.6

| DATA STORAGE REGION 212 | |
|---|---|
| DATA ID | DATA |
| $id_1$ | $d_1$ |
| $id_2$ | $d_2$ |
| $id_3$ | $d_3$ |
| $id_4$ | $d_4$ |
| $id_5$ | $d_5$ |
| ⋮ | ⋮ |
| ⋮ | ⋮ |

Fig. 7

| 213 | |
|---|---|
| SEARCH HISTORY STORAGE REGION | |
| TRAPDOOR | DETERMINISTIC ENCRYPTED KEYWORD |
| $td_1$ | $det_1$ |
| $td_2$ | $det_2$ |
| $td_3$ | $det_3$ |
| $td_4$ | $det_4$ |
| $td_5$ | $det_5$ |
| ⋮ | ⋮ |
| ⋮ | ⋮ |

Fig. 8

| 211 | | |
|---|---|---|
| ENCRYPTED KEYWORD STORAGE REGION | | |
| ENCRYPTED KEYWORD | DETERMINISTIC ENCRYPTED KEYWORD | DATA ID |
| $c_1$ | | $id_1$ |
| $c_2$ | | $id_2$ |
| $c_3$ | | $id_3$ |
| $c_4$ | | $id_4$ |
| $c_5$ | | $id_5$ |
| | | |
| | | |

| DATA STORAGE REGION | |
|---|---|
| DATA ID | DATA |
| $id_1$ | $d_1$ |
| $id_2$ | $d_2$ |
| $id_3$ | $d_3$ |
| $id_4$ | $d_4$ |
| $id_5$ | $d_5$ |
| | |
| | |

| ENCRYPTED KEYWORD STORAGE REGION | | |
|---|---|---|
| ENCRYPTED KEYWORD | DETERMINISTIC ENCRYPTED KEYWORD | DATA ID |
| $c_1$ | | $id_1$ |
| $c_2$ | | $id_2$ |
| $c_3$ | | $id_3$ |
| $c_4$ | | $id_4$ |
| $c_5$ | | $id_5$ |
| $c_6$ | | $id_6$ |
| | | |

| DATA STORAGE REGION | |
|---|---|
| DATA ID | DATA |
| $id_1$ | $d_1$ |
| $id_2$ | $d_2$ |
| $id_3$ | $d_3$ |
| $id_4$ | $d_4$ |
| $id_5$ | $d_5$ |
| $id_6$ | $d_6$ |
| | |

| SEARCH HISTORY STORAGE REGION | |
|---|---|
| TRAPDOOR | DETERMINISTIC ENCRYPTED KEYWORD |
| $td_1$ | $det_1$ |
| $td_2$ | $det_2$ |
| $td_3$ | $det_3$ |
| $td_4$ | $det_4$ |
| $td_5$ | $det_5$ |
| | |
| | |

Fig.13

| ENCRYPTED KEYWORD STORAGE REGION 211 | | |
|---|---|---|
| ENCRYPTED KEYWORD | DETERMINISTIC ENCRYPTED KEYWORD | DATA ID |
| $c_1$ | | $id_1$ |
| $c_2$ | | $id_2$ |
| $c_3$ | | $id_3$ |
| $c_4$ | | $id_4$ |
| $c_5$ | | $id_5$ |
| $c_6$ | $det_2$ | $id_6$ |
| | | |

Fig.14

| ENCRYPTED KEYWORD STORAGE REGION 211 | | |
|---|---|---|
| ENCRYPTED KEYWORD | DETERMINISTIC ENCRYPTED KEYWORD | DATA ID |
| $c_1$ | | $id_1$ |
| $c_2$ | $det_6$ | $id_2$ |
| $c_3$ | | $id_3$ |
| $c_4$ | | $id_4$ |
| $c_5$ | $det_6$ | $id_5$ |
| $c_6$ | | $id_6$ |
| | | |

| SEARCH HISTORY STORAGE REGION | |
|---|---|
| TRAPDOOR | DETERMINISTIC ENCRYPTED KEYWORD |
| $td_1$ | $det_1$ |
| $td_2$ | $det_2$ |
| $td_3$ | $det_3$ |
| $td_4$ | $det_4$ |
| $td_5$ | $det_5$ |
| $td_6$ | $det_6$ |
| | |

| ENCRYPTED KEYWORD STORAGE REGION | | | |
|---|---|---|---|
| RECORD ID | ENCRYPTED KEYWORD | DETERMINISTIC ENCRYPTED KEYWORD | DATA ID |
| 1 | $c_1$ | | $id_1$ |
| 2 | $c_2$ | $det_6$ | $id_2$ |
| 3 | $c_3$ | $det_2$ | $id_3$ |
| 4 | $c_4$ | | $id_4$ |
| 5 | $c_5$ | $det_6$ | $id_5$ |
| 6 | $c_6$ | | $id_6$ |
| | | | |

| TRAPDOOR | DETERMINISTIC ENCRYPTED KEYWORD | RECORD COLLATED USING TRAPDOOR |
|---|---|---|
| SEARCH HISTORY STORAGE REGION ||| 
|  | $det_1$ | 1~5 |
|  | $det_2$ | 1~5 |
| $td_3$ | $det_3$ | 1~6 |
| $td_4$ | $det_4$ | 1~6 |
| $td_5$ | $det_5$ | 1~6 |
| $td_6$ | $det_6$ | 1~6 |
|  |  |  |

| ENCRYPTED KEYWORD | DETERMINISTIC ENCRYPTED KEYWORD | DATA |
|---|---|---|
| ENCRYPTED KEYWORD STORAGE REGION + DATA STORAGE REGION |||
| $c_1$ |  | $d_1$ |
| $c_2$ |  | $d_2$ |
| $c_3$ |  | $d_3$ |
| $c_4$ |  | $d_4$ |
| $c_5$ |  | $d_5$ |
| ⋮ |  | ⋮ |
| ⋮ |  | ⋮ |

Fig. 19

| ENCRYPTED KEYWORD STORAGE REGION ||| 
|---|---|---|
| ENCRYPTED KEYWORD | DETERMINISTIC ENCRYPTED KEYWORD | DATA ID |
| $c_1$ | | $id_1$ |
| $c_2$ | | $id_2$ |
| $c_3$ | | $id_3$ |
| $c_4$ | | $id_3$ |
| $c_5$ | | $id_4$ |
| ⋮ | | ⋮ |
| ⋮ | | ⋮ |

Fig.20

| ENCRYPTED KEYWORD STORAGE REGION |||||
|---|---|---|---|---|
| ENCRYPTED KEYWORD 1 | DETERMINISTIC ENCRYPTED KEYWORD 1 | ENCRYPTED KEYWORD 2 | DETERMINISTIC ENCRYPTED KEYWORD 2 | DATA ID |
| $c_{11}$ | | $c_{12}$ | | $id_1$ |
| $c_{21}$ | | $c_{22}$ | | $id_2$ |
| $c_{31}$ | | $c_{32}$ | | $id_3$ |
| $c_{41}$ | | $c_{42}$ | | $id_4$ |
| $c_{51}$ | | $c_{52}$ | | $id_5$ |
| ⋮ | | ⋮ | | ⋮ |
| ⋮ | | ⋮ | | ⋮ |

SERVER DEVICE, RECORDING MEDIUM, AND CONCEALED SEARCH SYSTEM

TECHNICAL FIELD

The present invention relates to a server device which conducts a concealed search, a concealed search program, a recording medium, and a concealed search system.

BACKGROUND ART

In the concealed search system, a searcher can search data saved in a server, by specifying a keyword. In the search, the data and keyword are concealed from the server. The concealed search system is expected to be applied to the outsourcing of confidential data management and the filtering of encrypted mail in a mail server. Various techniques have been proposed for the concealed search system such as a technique to achieve different types of security requirements as well as techniques to reduce the server storage, a searcher storage, communication overhead, and computation overhead.

The concealed search can be roughly classified into those that are based on deterministic encryption and those that are based on probabilistic encryption. The concealed search based on deterministic encryption is advantageous because, since the same keyword corresponds to the same encrypted keyword, the server only needs to conduct a binary matching check based on a specified encrypted keyword, enabling high-speed concealed search employing an existing search technique. The keyword frequency information, however, directly appears as the encrypted keyword frequency information. This leads to a defect that an attack called "frequency analysis" is possible in which the server estimates a corresponding keyword by examining the encrypted keyword frequency.

On the other hand, in the concealed search based on probabilistic encryption, since different encrypted keywords are generated from the same keyword, the keyword frequency information is not saved, and the system is not exposed to the frequency analysis attack described above. Instead, collation of the encrypted keyword and a search request (trapdoor) requires particular computation that is not a binary matching check. Also, the high-speed technique employed in ordinary search cannot be employed. Therefore, there is a problem that a lot of time is spent until the search is completed. As a countermeasure for this problem, a method is available that employs probabilistic encryption and deterministic encryption so that both the security of the probabilistic encryption and the high speed performance of the deterministic encryption are achieved.

Patent Literature 1 discloses a method of searching the value of a probabilistic encryption at a high speed by preparing a table that stores the value of the probabilistic encryption and a table that stores the value of the deterministic encryption and utilizing a table that holds an encrypted relation between the two tables.

CITATION LIST

Patent Literature

Patent Literature 1: JP 2011-198079

SUMMARY OF INVENTION

Technical Problem

According to the method of Patent Literature 1, in a data registration process, both the value of a probabilistic encryption and the value of a deterministic encryption are transmitted to a server. Information concerning the correspondence of the two values is encrypted in a later process. Therefore, if data leaks to an external attacker, the attacker cannot associate the value of the probabilistic encryption and the value of the deterministic encryption, so that the security of the data is maintained to the same level as with the probabilistic encryption. Meanwhile, the server itself can associate the value of the probabilistic encryption and the value of the deterministic encryption at the time of the data registration process. If the server is malicious, it can make a frequency analysis attack using the information on the correspondence of the two values. Then, the security against the server decreases to the same level as with the deterministic encryption.

The present invention has been made to solve the above problem, and has as its object to increase the search speed of the concealed search system as a whole by adopting the element of deterministic encryption, without the risk of decreasing the security against the server from the level of concealed search based on the probabilistic encryption.

Solution to Problem

A server device according to the present invention executes a concealed search and includes:

a server-side communication part that receives a set of a trapdoor and a deterministic encrypted keyword, as a concealed search request from a search device, the trapdoor being generated from a keyword in accordance with a probabilistic encryption scheme and used for a matching check with an encrypted keyword obtained by encrypting a keyword of search target data in the concealed search in accordance with the probabilistic encryption scheme, the deterministic encrypted keyword being generated from the keyword from which the trapdoor has been generated, in accordance with a deterministic encryption scheme;

a search history storage part that stores the set of the trapdoor and the deterministic encrypted keyword, as a history of a past concealed search request, the set being received by the server-side communication part;

a data storage part that stores keyword information in which the search target data and the encrypted keyword of the search target data are associated with each other, wherein if the deterministic encrypted keyword is obvious, the deterministic encrypted keyword corresponding to the encrypted keyword is further associated with the search target data and the encrypted keyword of the search target data in the keyword information; and a checking part that checks whether or not the deterministic encrypted keyword which matches the deterministic encrypted keyword received by the server-side communication part exists in the search history storage part; and if it is decided that the deterministic encrypted keyword exists, executes the concealed search of the search target data targeting the data storage part, based on the deterministic encryption scheme using the deterministic encrypted keyword existing in the search history storage part, and if it is decided that the deterministic encrypted keyword does not exist, executes the concealed search of the search target data targeting the data storage part, based on the probabilistic encryption scheme using the trapdoor received and the encrypted keyword of the keyword information stored in the data storage part.

Advantageous Effects of Invention

According to the present invention, the search speed of the concealed search system as a whole can be increased without the risk of decreasing the security against the server from the level of concealed search based on the probabilistic encryption.

BRIEF DESCRIPTION OF DRAWINGS

FIG. 5 is an illustration representing an encrypted keyword storage region 211 according to Embodiment 1.

FIG. 6 is an illustration representing a data storage region 212 according to Embodiment 1.

FIG. 7 is an illustration representing a search history storage region 213 according to Embodiment 1.

FIG. 8 is an illustration representing the encrypted keyword storage region 211 according to Embodiment 1.

FIG. 9 is an illustration representing the data storage region 212 according to Embodiment 1.

FIG. 10 is an illustration representing the encrypted keyword storage region 211 according to Embodiment 1.

FIG. 11 is an illustration representing the data storage region 212 according to Embodiment 1.

FIG. 12 is an illustration representing the search history storage region 213 according to Embodiment 1.

FIG. 13 is an illustration representing the encrypted keyword storage region 211 according to Embodiment 1.

FIG. 14 is an illustration representing the encrypted keyword storage region 211 according to Embodiment 1.

FIG. 15 is an illustration representing the search history storage region 213 according to Embodiment 1.

FIG. 16 is an illustration representing the encrypted keyword storage region 211 according to Embodiment 1.

FIG. 17 is an illustration representing the search history storage region 213 according to Embodiment 1.

FIG. 18 is an illustration representing a storage region having a combined content of the encrypted keyword storage region 211 and data storage region 212 according to Embodiment 1.

FIG. 19 is an illustration representing the encrypted keyword storage region 211 according to Embodiment 1.

FIG. 20 is an illustration representing the encrypted keyword storage region 211 according to Embodiment 1.

DESCRIPTION OF EMBODIMENTS

Embodiment 1

Embodiment 1 will be described with reference to FIGS. 1 to 25.

FIGS. 1 to 4 are diagrams illustrating the configurations of a concealed search system 100 and other devices.

FIGS. 5 to 20 are illustrations representing the statuses of storage regions.

FIGS. 21 to 25 are flowcharts indicating the operations of the devices. Where a constituent element is indicated in parentheses, the constituent element is the subject of the process.

Figure 1:
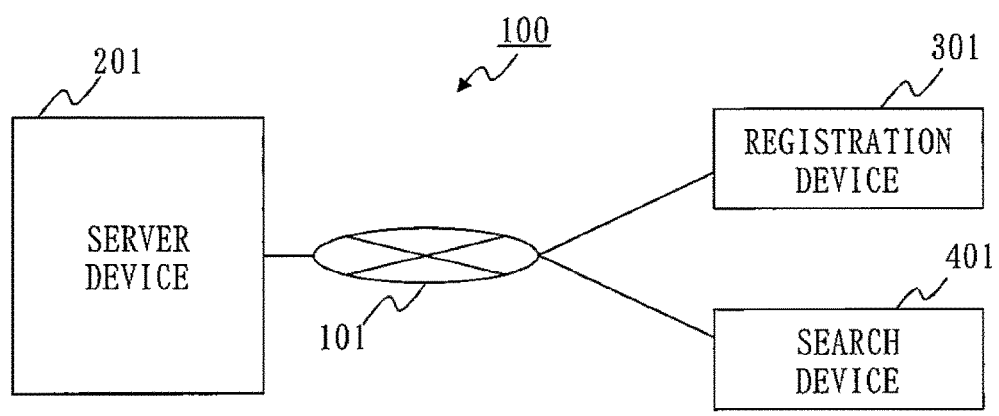
FIG. 1 is a diagram illustrating a configuration of a concealed search system 100 according to Embodiment 1.

FIG. 1 illustrates a configuration example of the concealed search system 100. In the concealed search system 100, the user can search data (search target data) saved in a server device 201, by specifying a keyword. In the search, the concealed search system 100 conceals the data and the keyword from the server device 201. The concealed search system 100 includes the server device 201, an information registration device 301, and an information search device 401. The server device 201, the information registration device 301, and the information search device 401 are connected to a network 101 and communicate with each other via the network 101. The information registration device 301 and the information search device 401 will be respectively referred to as the registration device 301 and the search device 401 hereinafter.

Figure 2:
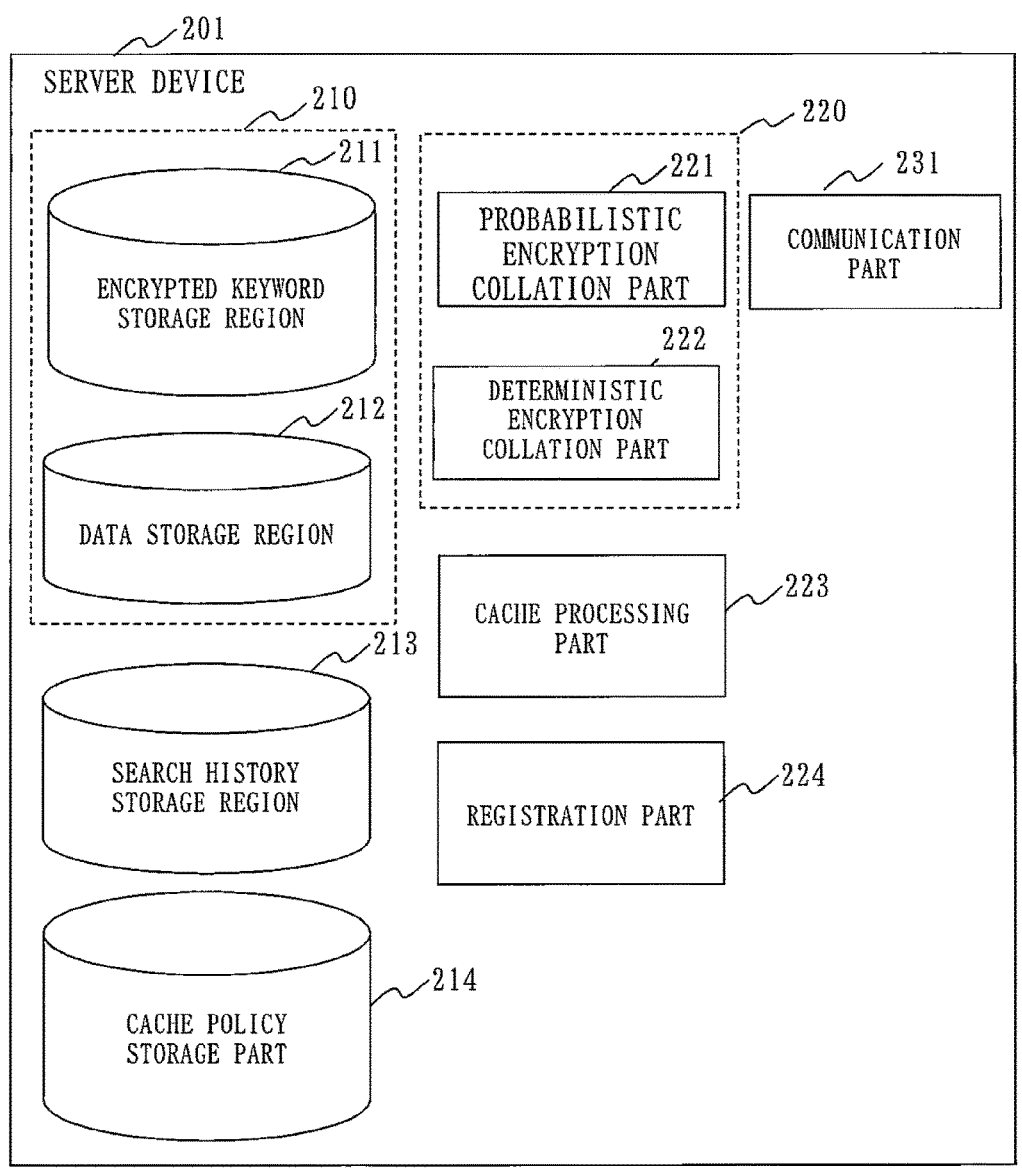
FIG. 2 is a block diagram of a server device 201 according to Embodiment 1.

FIG. 2 is a block diagram illustrating a configuration example of the server device 201, in the concealed search system 100, where the data and keyword are held and searched for. The constituent elements of each device illustrated in FIG. 2 will be described below.

(1) An encrypted keyword storage region 211 associates a keyword (to be referred to as encrypted keyword hereinafter) encrypted by probabilistic encryption and a keyword (to be referred to as deterministic encrypted keyword hereinafter) encrypted by deterministic encryption with corresponding data IDs, and stores the associated encrypted keyword and deterministic encrypted keyword.

FIG. 5 represents an example of the data stored in the encrypted keyword storage region 211.

(2) A data storage region 212 associates the data with the corresponding data ID and stores the associated data.

FIG. 6 represents an example of the data stored in the data storage region 212. Examples of the data include a numerical value such as age, an attribute such as sex, a character string such as name, and a file such as a document. A plurality of types of data may be held for one data ID. The encrypted keyword storage region 211 and the data storage region 212 constitute a data storage part 210. As will be described later in S201 of FIG. 23, in the encrypted keyword storage region 211 and the data storage region 212, the encrypted keyword and the data are associated through a data ID. For example, in FIGS. 5 and 6, an encrypted keyword ($c_1$) and data ($d_1$) are associated with each other through a data ID ($id_1$). If an associated deterministic encrypted keyword (det) is obvious, the obvious deterministic encrypted keyword (det) is associated with an encrypted keyword (c) and data (d). Information that holds this relation is called keyword information. The keyword information may be realized by the encrypted keyword storage region 211 and the data storage region 212, or by a content to be described later with reference to FIG. 18.

(3) A search history storage region 213 (search history storage part) stores a past search request sent from the search device 401, as a search history.

FIG. 7 represents an example of data stored in the search history storage region 213.

(4) A cache policy storage region 214 stores a policy on whether or not to store the search request sent from the search device 401 and the result of a search process, to the search history storage region 213 and encrypted keyword storage region 211.

Examples of the Policy Include:
to cache all search requests and all search results;
to cache the search request and search result only when specified by the searcher;
to cache all search requests and to cache the search results of a search request executed n times or more; and
to cache a deterministic encrypted keyword in the search request, and all search results.

(5) A probabilistic encryption collation part 221 checks whether or not keywords match between a trapdoor included in the search request sent from the search device 401 and the encrypted keyword (by probabilistic encryption) stored by the encrypted keyword storage region 211. The probabilistic encryption collation part 221 also conducts a keyword matching check between the trapdoor stored in the search history storage region 213 and an encrypted keyword sent from the registration device 301. These processes can be realized using an existing cryptographic technology (concealed search technique based on probabilistic encryption).

(6) A deterministic encryption collation part 222 checks whether or not keywords match between a deterministic encrypted keyword included in the search request transmitted by the search device 401 and a deterministic encrypted keyword stored in the encrypted keyword storage region 211. This process can be realized using a binary matching check. The probabilistic encryption collation part 221 and the deterministic encryption collation part 222 constitute a checking part 220.

(7) Based on the content of the cache policy storage region 214, a cache processing part 223 stores the search request sent from the search device 401 and the result of the search process to the search history storage region 213 and the encrypted keyword storage region 211.

(8) A registration part 224 stores the encrypted keyword, encrypted data, and the like received from the registration device 301, to the encrypted keyword storage region 211 and the data storage region 212.

(9) A communication part 231 (server-side communication part) communicates with the registration device 301 and the search device 401.

Figure 3:
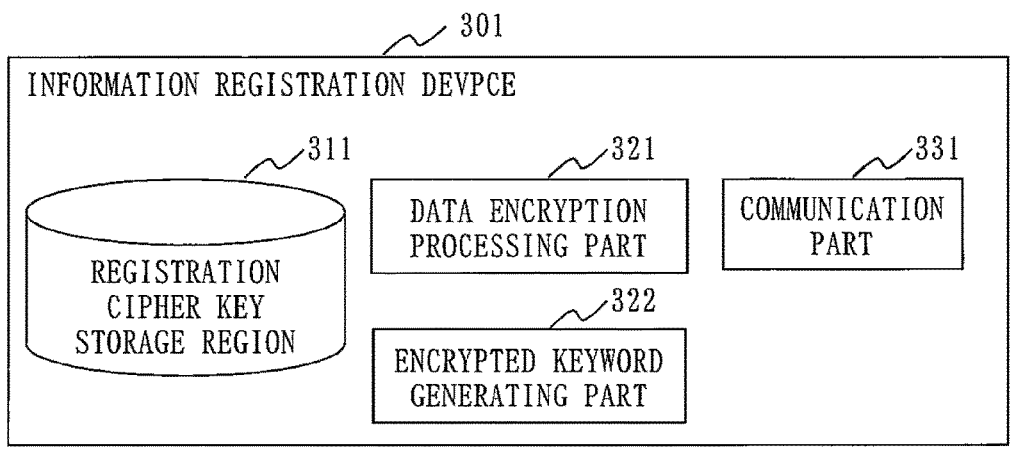
FIG. 3 is a block diagram of a registration device 301 according to Embodiment 1.

FIG. 3 is a block diagram illustrating a configuration example of the registration device 301 in the concealed search system 100, which registers the encrypted data (search target data) to the server device 201.

(1) Referring to FIG. 3, the registration cipher key storage region 311 stores cipher keys used for data encryption and encrypted keyword generation in data registration.

(2) A data encryption processing part 321 encrypts the data using a data encryption key stored in the registration cipher key storage region 311. This process can be realized using an existing cryptographic technology (for example, public key cryptography) such as RSA (registered trademark).

(3) Using an encrypted keyword generation key stored in the registration cipher key storage region 311, an encrypted keyword generating part 322 generates an encrypted keyword for concealed search, from a keyword. This process can be realized using an existing cryptographic technology (concealed search technique based on probabilistic encryption).

(4) A communication part 331 communicates with the server device 201.

Figure 4:
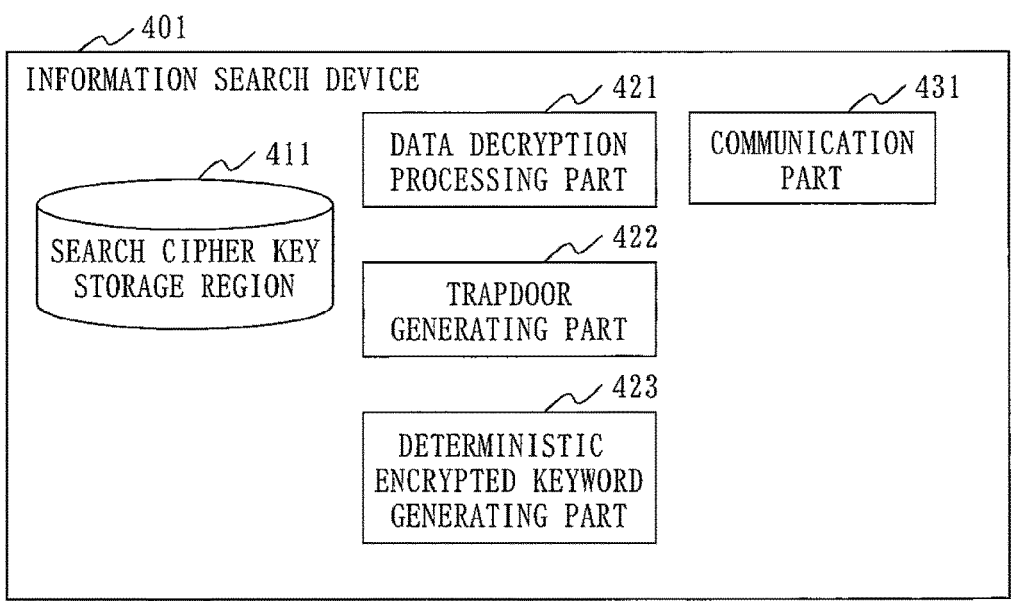
FIG. 4 is a block diagram of a search device 401 according to Embodiment 1.

FIG. 4 is a block diagram illustrating a configuration example of the search device 401 in the concealed search system 100, which requests the server device 201 to search encrypted data.

(1) Referring to FIG. 4, a search cipher key storage region 411 stores private information used for trapdoor generation in data search, deterministic encrypted keyword generation in data search, and data decryption in data search.

(2) A data decryption processing part 421 decrypts the data using a data decryption key stored in the search cipher key storage region 411. This process can be realized using an existing cryptographic technology (for example, public key cryptography such as RSA (registered trademark)).

(3) A trapdoor generating part 422 generates a search request (trapdoor) for concealed search from the keyword using a trapdoor generation key stored in the search cipher key storage region 411. This process can be realized using an existing cryptographic technology (concealed search technique based on probabilistic encryption).

(4) A deterministic encrypted keyword generating part 423 generates a deterministic encrypted keyword from the keyword using a deterministic encrypted keyword generation key stored in the search cipher key storage region 411. This process can be realized using an existing cryptographic technology (common key cryptography such as AES).

(5) A communication part 431 (search-side transmission part) communicates with the server device 201.

The procedures in the concealed search system 100 are roughly classified into
(A) a portion where initial setting of each device is carried out,
(B) a portion where the registration device 301 transmits and stores the search target data to the server device 201, and
(C) a portion where the search device 401 searches for data on the server device 201 and acquires the data. Each procedure will be described below.

(A. Initial Device Setting)

Figure 21:
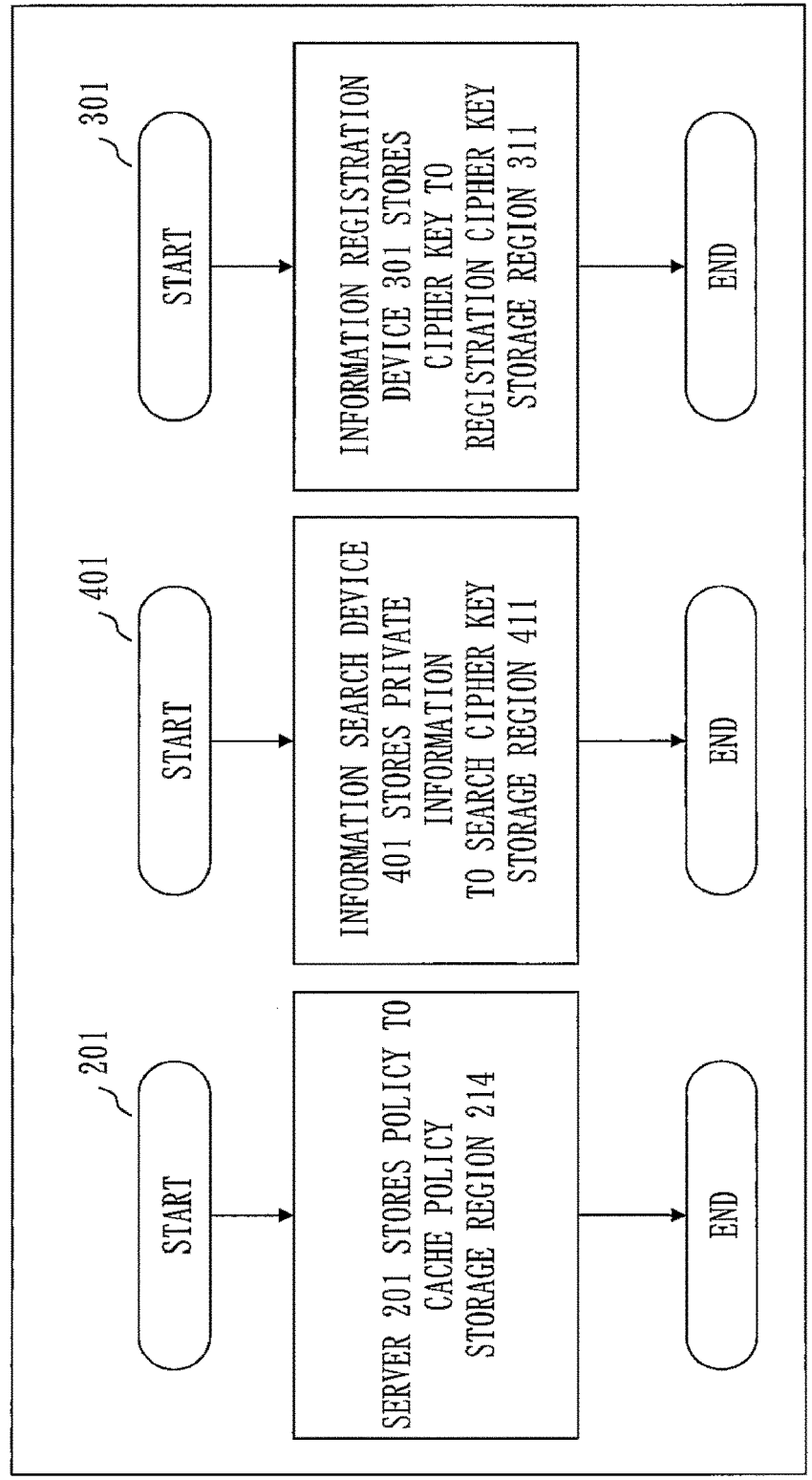
FIG. 21 is a flowchart indicating the initial setting of the server device 201, registration device 301, and search device 401 according to Embodiment 1.

FIG. 21 indicates initial setting of the server device 201 and the like. As shown in FIG. 21, the server device 201 stores the cache policy to the cache policy storage region 214. The cache policy is, for example, a policy on "whether or not to store the search request sent from the search device 401 and the result of a search process to the search history storage region 213 and the encrypted keyword storage region 211". The cache policy may be decided by the administrator of a company or the like that utilizes the search device 401 and the concealed search system 100, and sent to the server device 201 by the administrator. Alternatively, the cache policy may be decided by the server device 201 itself. In the following description, the cache policy is "to cache all search requests and search results".

As indicated in FIG. 21, the search device 401 stores the private information to be used for data decryption, trapdoor generation, and deterministic encrypted keyword generation, to the search cipher key storage region 411. The private information may be generated by the data decryption processing part 421, trapdoor generating part 422, and deterministic encrypted keyword generating part 423 themselves. Alternatively, private information appropriately generated by an external device may be acquired. If the private information for data decryption and trapdoor generation is to be generated by the search device 401 itself, corresponding cipher keys for data encryption and encrypted keyword generation may be open to the public or sent to the registration device 301.

As indicated in FIG. 21, the registration device 301 stores the cipher keys to be used for data encryption and encrypted keyword generation to the registration cipher key storage region 311. Usually, in order that the right search device 401 can perform search/decryption process correctly, the registration device 301 acquires cipher keys corresponding to the private information stored in the search cipher key storage region 411 of the search device 401, and stores the acquired cipher keys. The procedure is now completed.

(B. Transmission and Storage of Search Target Data)

When the registration device 301 transmits data to the server device 201, the registration device 301 transmits encrypted keyword and encrypted data separately so that the search device 401 can perform concealed search later on. The server device 201 that has received the encrypted keyword and encrypted data stores the encrypted keyword and encrypted data to the encrypted keyword storage region 211 and the data storage region 212 by referring to the search history storage region 213 as required. This procedure will be described below step by step together with a practical example.

Figure 22:
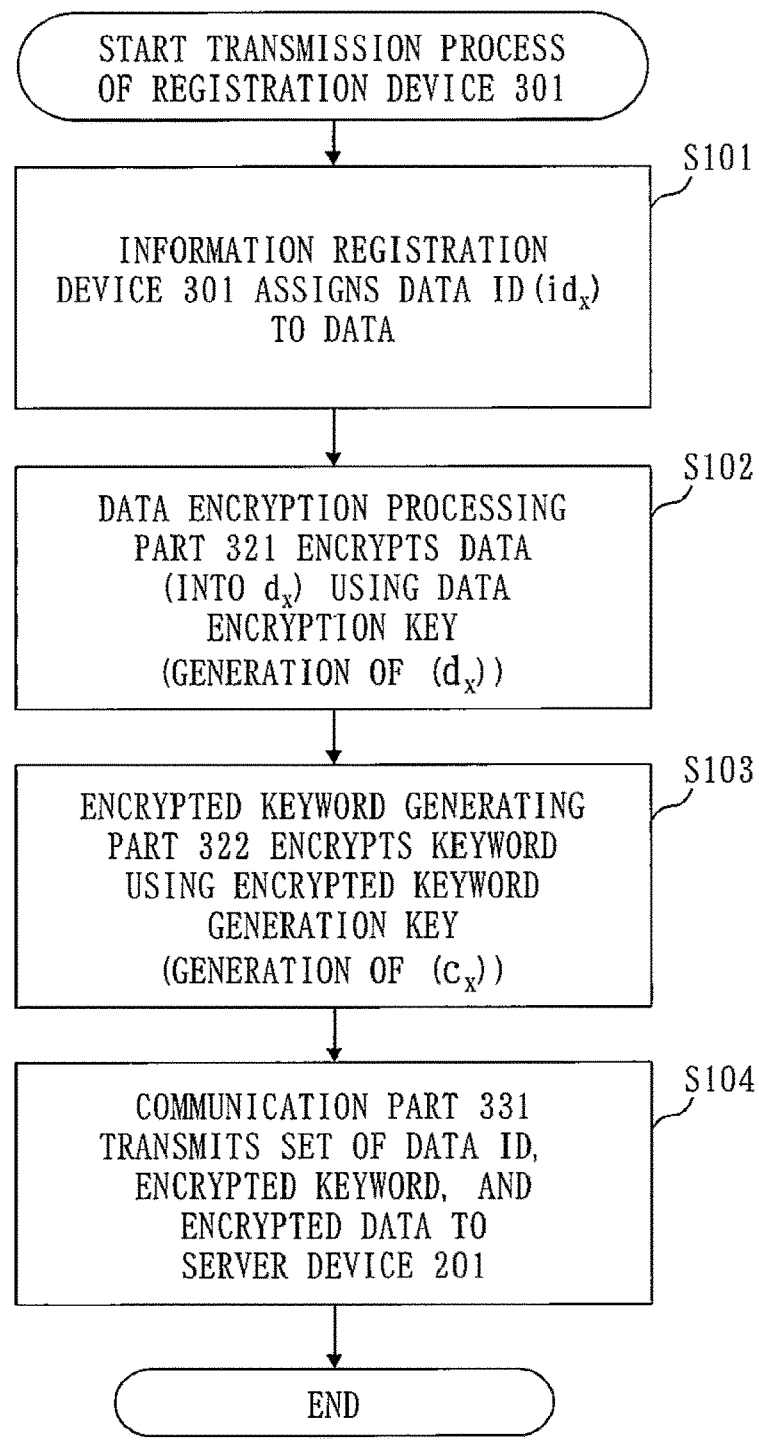
FIG. 22 is a flowchart indicating the transmission process of the information registration device 301 according to Embodiment 1.

FIG. 22 is a flowchart of the transmission process of the registration device 301. The process of transmitting data to the server device 201 by the registration device 301 will be described with reference to FIG. 22.

(1) First, in S101, the data encryption processing part 321 of the registration device 301 assigns a unique data ID (id) to the data.

(2) Then, in S102, the data encryption processing part 321 encrypts the data using data encryption key stored in the registration cipher key storage region 311. An existing cryptographic technology that allows only the right search device 401 to decrypt is utilized (the encrypted data is denoted as $d_x$).

(3) After that, in S103, the encrypted keyword generating part 322 encrypts the keyword associated with the data, using the encrypted keyword generation key stored in the registration cipher key storage region 311. In this case, an existing cryptographic technology (concealed search technique based on probabilistic encryption) that allows only the right search device 401 to search is utilized (the encrypted keyword is denoted as $c_x$).

(4) Then, in S104, the communication part 331 transmits a set ($id_x$, $c_x$, $d_x$) of the data ID, encrypted keyword, and encrypted data to the server device 201.

(Server Device 201)

Figure 23:
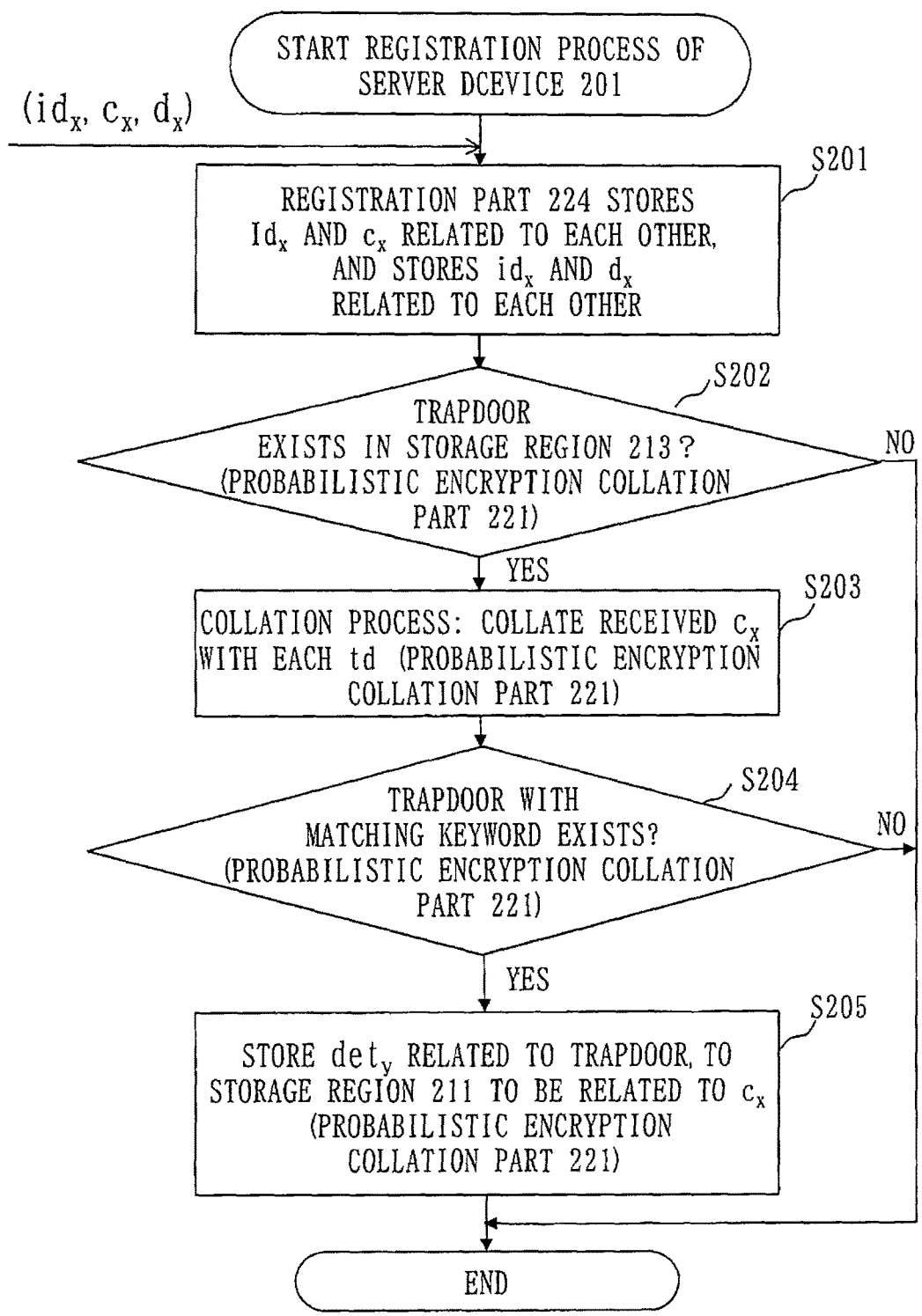
FIG. 23 is a flowchart indicating the registration process of the server device 201 according to Embodiment 1.

FIG. 23 is a flowchart of a data registration process of the server device 201. The data registration process by the server device 201 will be described with reference to FIG. 23.

(1) When the communication part 231 receives ($id_x$, $c_x$, $d_x$) from the registration device 301, the registration part 224 associates the encrypted keyword ($c_x$) with the data ID ($id_x$) and stores the associated encryption keyword ($c_x$) and data ID ($id_x$) to the keyword storage region 211, and associates the encrypted data ($d_x$) with the data ID ($id_x$) and stores the associated encrypted data ($d_x$) and data ID ($id_x$) to the data storage region 212. (S201). Namely, the registration part 224 associates the data and stores the associated data like ($c_x$, $id_x$), ($d_x$, $id_x$). For example, assume that the contents Of the encrypted keyword storage region 211 and data storage region 212 before this procedure are as in FIGS. 8 and 9. In this case, when the server device 201 receives ($id_6$, $c_6$, $d_6$) and processes ($id_6$, $c_6$, $d_6$), the contents of the encrypted keyword storage region 211 and data storage region 212 are updated as in FIGS. 10 and 11, respectively.

(2) In S202, the probabilistic encryption collation part 221 checks whether or not a trapdoor exists in the search history storage region 213. The "trapdoor" is information that is transmitted from the search device 401 to the server device 201 as a concealed search request. The trapdoor will be described later referring to S301 of FIG. 24. If a trapdoor exists (YES in S202), the probabilistic encryption collation part 221 performs a collation process using the trapdoor (if a trapdoor does not exist, this process is skipped).

(3) If a trapdoor exists, then in S203, the probabilistic encryption collation part 221 executes a matching check (executes a collation process) on whether or not the keywords match between each trapdoor ($td_i$) stored in the search history storage region 213 and the received encrypted keyword ($c_x$).

(4) In S204, the probabilistic encryption collation part 221 checks whether or not a trapdoor with a matching keyword exists among the trapdoors ($td_1$) in the search history storage region 213. If a trapdoor with a matching keyword exists (this trapdoor will be denoted as $td_y$), the probabilistic encryption collation part 221 specifies a deterministic encrypted keyword ($det_y$) associated with the trapdoor ($td_y$) and stored in the search history storage region 213. The probabilistic encryption collation part 221 associates the specified keyword ($det_y$) with the received encrypted keyword ($c_x$) and stores the associated keyword ($det_y$) as the deterministic encrypted keyword in the encrypted keyword storage region 211 (S205).

For example, in a sequel to the above example, if the content of the search history storage region 213 is as represented in FIG. 12, the probabilistic encryption collation part 221 conducts a keyword matching check of the trapdoors ($td_1$) to ($td_5$) and the encrypted keyword ($c_6$). If keyword matching is confirmed between ($td_2$) and ($c_6$), it indicates that the deterministic encrypted keyword corresponding to the encrypted keyword ($c_6$) is ($det_2$). Thus, ($c_6$) and ($det_2$) are associated with each other and stored in the encrypted keyword storage region 211. As a result, the encrypted keyword storage region 211 is updated as in FIG. 13. If a keyword matching is not found, no particular process is performed. The procedure is now completed.

(C. Search and Acquisition of Data)

The right search device 401 can perform concealed search for data stored in the server device 201 by specifying a keyword. This procedure will be described below step by step together with a practical example.

(Search Request by Search Device 401)

Figure 24:
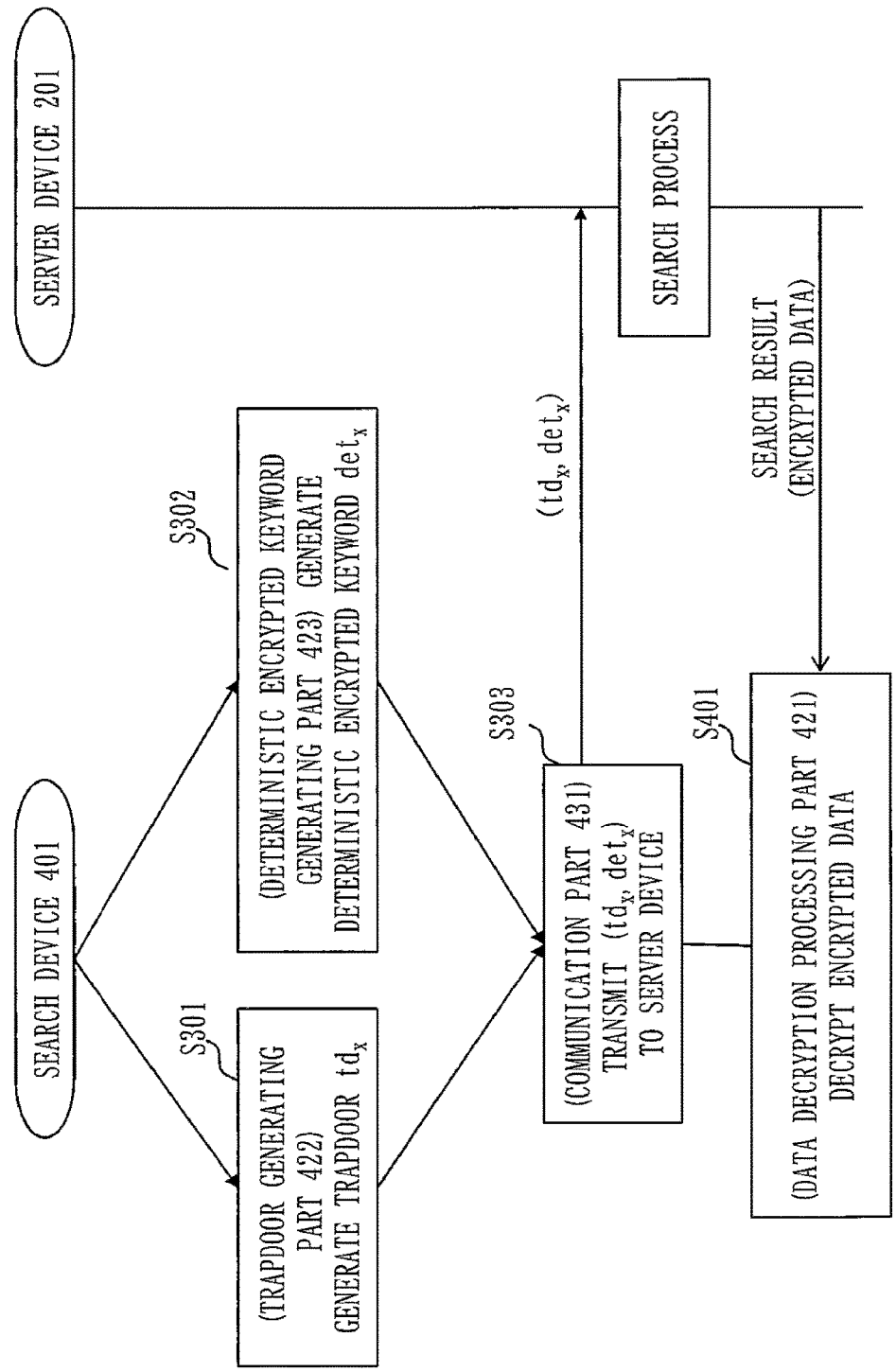
FIG. 24 is a flowchart indicating a search request transmission process of the search device 401 according to Embodiment 1.

FIG. 24 is a flowchart indicating a search request process of the search device 401. The search request transmission process by the search device 401 will be described with reference to FIG. 24.

(1) First, in S301, using the trapdoor generation key stored in the search cipher key storage region 411, the trapdoor generating part 422 of the search device 401 generates a trapdoor from a keyword to be searched. In this case, an existing cryptographic technology (concealed search technique based on probabilistic encryption) will be utilized (the trapdoor will be referred to as $td_x$). The trapdoor is information that is generated from the keyword to be searched in accordance with a probabilistic encryption. The trapdoor is used in a matching check with the encrypted keyword that has been obtained by encrypting the keyword of the search target data in concealed search in accordance with the probabilistic encryption. Simultaneously, in S302, using the deterministic encrypted keyword generation key stored in the search cipher key storage region 411, the deterministic encrypted keyword generating part 423 generates a deterministic encrypted keyword from the keyword to be searched. In this case, an existing cryptographic technology (for example, a common key cryptography such as AES) will be used as the deterministic encryption (the deterministic encrypted keyword will be denoted as $det_x$). In other words, the deterministic encrypted keyword generating part 423 generates the deterministic encrypted keyword ($det_x$) from the keyword from which the trapdoor $td_x$ has been generated, in accordance with the deterministic encryption scheme.

Then, (2) the communication part 431 transmits the set ($td_x$, $det_x$) of the trapdoor ($td_x$) and deterministic encrypted keyword ($det_x$) to the server device 201 as the concealed search request (S303).

Note that since ($det_x$) is generated by the deterministic encryption, if the keyword to be searched is the same, the same value is always obtained.

(3) The search device 401 receives a search result from the server device 201 (S401).

(Server Device 201)

Figure 25:
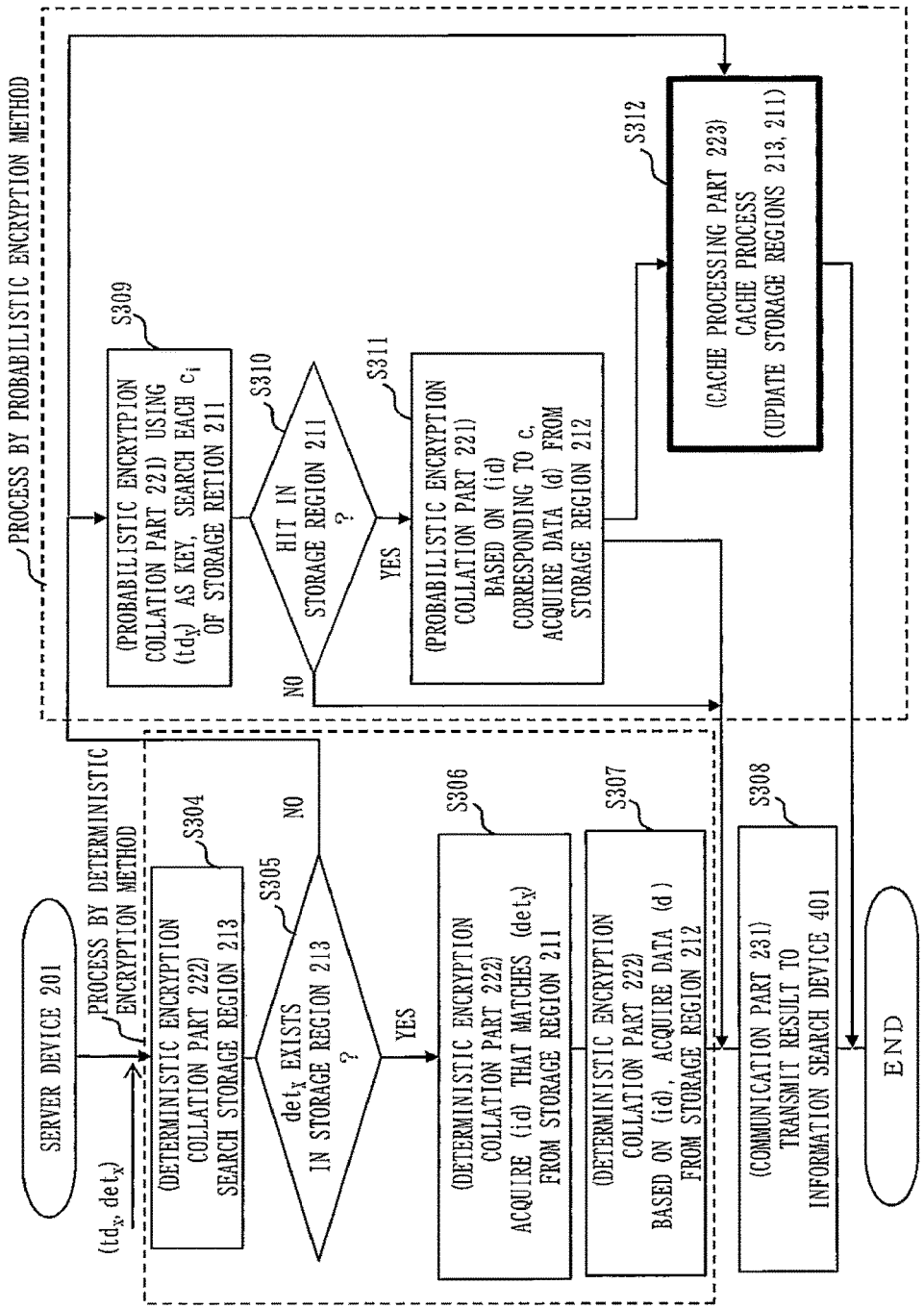
FIG. 25 is a flowchart indicating concealed search of the server device 201 according to Embodiment 1.

FIG. 25 is a process flowchart of a concealed search of the server device 201. The concealed search process of the server device 201 will be described with reference to FIG. 25.

(1) The communication part 231 receives a search request ($td_x$, $det_x$) from the search device 401.

(2) The server device 201 having received this search request first checks whether or not the keyword to be searched is included in the past search history. More specifically, the deterministic encryption collation part 222 checks whether or not keywords match between each deterministic encrypted keyword ($det_i$) stored in the search history storage region 213 and a deterministic encrypted keyword ($det_x$) included in the search request ($td_x$, $det_x$) (S304, S305). Since this checking (search) can be performed by a binary matching check, an existing search technique (for a case where encryption is not considered) can be utilized. Examples of the existing search technique include achieving speed-up by sorting data in advance and achieving speed-up by use of a hash table.

(3) If a binary matching is found (YES in S305), it indicates that a past search result can be utilized. This perception is based the cache process (S312) performed by a cache processing part to be described later. The deterministic encryption collation part 222 extracts, from the encrypted keyword storage region 211, a record in which the deterministic encrypted keyword matches the deterministic encrypted keyword ($det_x$) included in the search request. In the same manner as described above (S304), since this extraction process can be performed by a binary matching check, an existing search technique can be utilized. Then, the deterministic encryption collation part 222 acquires a data ID (id) from the matching record (S306) and acquires encrypted data (d) corresponding to the acquired data ID from the data storage region 212 (S307).

(4) After that, the communication part 231 transmits the encrypted data acquired in S307 to the search device 401 (S308). If a plurality of pieces of encrypted data are acquired, all of them may be transmitted, or part of them may be transmitted.

(5) On the other hand, if a binary matching is not found (NO in S305), the records in the encrypted keyword storage region 211 are searched one by one utilizing an existing concealed search technique. More specifically, the probabilistic encryption collation part 221 conducts a keyword matching check for all encrypted keywords ($c_i$) contained in the encrypted keyword storage region 211 with reference to the trapdoor ($td_x$) included in the search request ($td_x$, $det_x$) (S309). If an encrypted keyword (c) that matches the received trapdoor ($td_x$) is hit, (YES in S310), the probabilistic encryption collation part 221 acquires a data ID (id) out of the matching record from the encrypted keyword storage region 211, and acquires encrypted data corresponding to the data ID (id) from the data storage region 212 (S311). After that, the communication part 231 transmits the encrypted data acquired in the above manner to the search device 401 (S308).

(6) If an encrypted keyword corresponding to the search request does not exist (NO in S310), information indicating the nonexistence is transmitted.

(7) <Cache Process>

If a binary matching of the deterministic encrypted keyword is not found (NO in S305), then, a cache process of "search request and search result" is further practiced (S312). More specifically, the cache processing part 223 stores the search request to the search history storage region 213 in accordance with the content of the cache policy (history policy) stored in the cache policy storage region 214. For the record with a matching keyword among the records of the encrypted keyword storage region 211, the cache processing part 223 stores the deterministic encrypted keyword (det) included in the search request, as the deterministic encrypted keyword (det) (S311, S312). In this case, in the checking of S310, if an encrypted keyword (c) corresponding to ($td_x$) of the search request ($td_x$, $det_x$) is hit in the encrypted keyword storage region 211 (c that is hit is denoted as $c_k$), the cache processing part 223 decides whether or not to store $det_x$ included in the search request ($td_x$, $det_x$) in accordance with the content of the cache policy (association policy) stored in the cache policy storage region 214. If the cache policy instructs to store $det_x$, the cache processing part 223 stores $det_x$ of the search request by associating $det_x$ with ($c_k$) of the encrypted keyword storage region 211. Due to the cache process of S312, in every subsequent search conducted using the same keyword, high-speed search (binary matching search) utilizing the deterministic encrypted keyword (det) can be performed (S306, S307). Where data (id, c, d) is transmitted from the registration device 301 and additionally registered, an encrypted keyword (c) that matches the past search keyword (td) can be listed up in advance utilizing the trapdoor of the search history storage region 213. As a result, the time required for the search process can be shortened (S202 to S205 of FIG. 23).

(Search Device 401)

Finally, as illustrated in S401 of FIG. 24, the data decryption processing part 421 of the search device 401 that has received the encrypted data, being the search result, decrypts the encrypted data using the data decryption key stored in the search cipher key storage region 411. In this case, an existing cryptographic technology that allows only the right search device 401 to decrypt is utilized. The procedure is now completed.

A supplementary explanation on this procedure will be made with reference to an example. Assume that the contents of the encrypted keyword storage region 211, data storage region 212, and search history storage region 213 of the server device 201 are as indicated in FIGS. 10, 11, and 12, respectively. Also assume that the cache policy storage region 214 stores a policy to "cache all search requests and search results", as mentioned in the procedure (A. Initial Device Setting). A case will be considered where the search device 401 generates a search request ($td_6$, $det_6$) from a keyword which is to be searched for the first time, and transmits the search request to the server device 201. Namely, ($det_6$) is a value that is different from any one of ($det_1$) to ($det_5$). At this time, if the deterministic encryption collation part 222 of the server device 201 searches the search history storage region 213 (FIG. 12) for the deterministic encrypted keyword ($det_6$), the deterministic encrypted keyword ($det_6$) cannot be found. Thus, the probabilistic encryption collation part 221 searches the encrypted keyword storage region 211 (FIG. 10) for an encrypted keyword that matches the trapdoor ($td_6$). As a result, for example, if ($c_2$) and ($c_5$) are hit, the server device 201 transmits encrypted data ($d_2$) and ($d_5$) corresponding to ($c_2$) and ($c_5$) to the search device 401 as the search result. Based on the cache policy, the cache processing part 223 of the server device 201 stores the deterministic encrypted keyword ($det_6$) to a matching record in the encrypted keyword storage region 211 (FIG. 10) and stores the search request ($td_6$, $det_6$) to the search history storage region 213 (FIG. 12). As a result, the encrypted keyword storage region 211 and search history storage region 213 are updated as in FIGS. 14 and 15, respectively.

In this situation, assume that the search device 401 further transmits a search request ($td_7$, $det_6$) generated from the same keyword to the server device 201 (note that the deterministic encrypted keywords have the same value while the trapdoors have different values). When the deterministic encryption collation part 222 of the server device 201 searches the search history storage region 213 (FIG. 15) for the deterministic encrypted keyword ($det_6$), the deterministic encrypted keyword that has been stored as described above is found. Thus, the deterministic encryption collation part 222 searches the encrypted keyword storage region 211 (FIG. 14) for a record that includes the deterministic encrypted keyword ($det_6$). As a result, records that include ($c_2$) and ($c_5$) are hit. Thus, the server device 201 transmits encrypted data ($d_2$) and ($d_5$) corresponding to ($c_2$) and ($c_5$) to the search device 401 as the search results. Since the deterministic encrypted keyword is found this time by the binary matching checking of the search history storage region 213 (FIG. 15), a cache process concerning the search request and search result will not be performed.

As described above, the procedures of (A. Initial Device Setting) to (C. Search and Acquisition of Data) can realize a concealed search system in which the search device 401 can perform search while concealing data and keyword from the server device 201. As is apparent from the case described in (C. Search and Acquisition of Data), in second and subsequent searches that use the same keyword, a process (concealed search based on probabilistic encryption) by the probabilistic encryption collation part 221 is not performed at all, and all keyword matching checks are performed only as a binary matching check of the deterministic encryption collation part 222. Therefore, the time required for the search process can be shortened largely. At the same time, regarding the security, when compared to conventional concealed search (that uses only probabilistic encryption), the method described in this embodiment additionally discloses only the deterministic encrypted keyword ($det_x$) included in the search request to the server device 201. Hence, if a secure deterministic encrypted keyword is employed, the security against the server device 201 does not decrease at all. During the system operation, as represented in, for example, FIG. 14, the keyword identicalness may leak for some encrypted keywords in FIG. 14, (($c_2$) and ($c_5$)) stored in the encrypted keyword storage region 211. Note that this information is available to the server device 201 even in conventional concealed search (that employs only probabilistic encryption). Thus, the security against the server device 201 is not decreased.

On the other hand, because the server device 201 stores the deterministic encrypted keyword, additional information may leak to an attacker if data leaks to the external attacker. More specifically, in the conventional search request (that employs only the probabilistic encryption), when data leaks, the external attacker cannot make a frequency analysis attack. On the contrary, with the method described in this embodiment, a frequency analysis attack for a searched keyword is possible. This poses the issue of trade-off between "high-speed search" and "security against an external attacker". The cache policy storage region 214 and cache processing part 223 have as one of their roles to control this issue. More specifically, if the user side of the concealed search system 100 puts the highest priority to the speed-up of the search, all search histories and all search results may be cached, as in this embodiment. Alternatively, if the speed-up need be ensured only for a frequently used search keyword, a cache policy that satisfies it may be set.

Another significance of the cache policy is to control the number of trapdoors to be stored in the search history storage region 213. If all the search histories (or the trapdoors included in all the search histories) are cached as in Embodiment 1, when the number of trapdoors increases, data registration in the procedure of (B. Transmission and Storage of Search Target Data) wastes time for the collation process of the encrypted keyword and each trapdoor (S203). In view of this, a cache policy that restricts the number of trapdoors to be stored in the search history storage region 213 may be set, so that data registration will not take too much time.

In that case, an encrypted keyword (c) collated (collation of S309) with a certain trapdoor ($td_x$) and an encrypted keyword (c) non-collated may mix in the encrypted keyword storage region 211. Therefore, information for distinguishing the two different keywords is necessary. For example, assume that the encrypted keyword storage region 211 stores a content as represented in FIG. 16 and that the search history storage region 213 stores a content as represented in FIG. 17. FIGS. 16 and 17 can express the following contents. FIG. 17 can express the following circumstance. For record IDs 1 to 5 ($c_1$ to $c_5$) of the encrypted keyword storage region 211 (FIG. 16), collation (search collation) using trapdoors corresponding to ($det_1$) to ($det_6$), that is, ($td_1$) to ($td_6$), has been conducted, and after that, ($td_1$) and ($td_2$) are deleted. For the record ID 6 of FIG. 16, collation is performed only with ($td_3$) to ($td_6$). In this case, the server device 201 which has received ($td_7$, $det_1$) as the search request from the search device 401 recognizes that the record IDs 1 to 5 of FIG. 16 do not match in the search (without using the trapdoor ($td_7$)). This is apparent from FIG. 17 where the trapdoor corresponding to ($det_1$) is subjected to a search/collation process (S309) with the record IDs 1 to 5 ($c_1$ to $c_5$) of FIG. 16. Also, as is apparent from FIG. 16, none of the encrypted keywords ($c_1$ to $c_5$) is associated with ($det_1$), and thus the encrypted keywords ($c_1$ to $c_5$) do not match ($td_7$) corresponding to ($det_1$). In fine, only the collation process (collation during search) between the encrypted keyword ($c_6$) and the trapdoor ($td_7$) need be executed. Regarding the choice of the trapdoors at the time the number of the trapdoor reaches the maximum, an existing cache technique can be utilized.

According to this embodiment, the registration device 301 also encrypts data (pre-encryption data which will form the encrypted data) not used for search and transmits the encrypted data to the server device 201. However, if the data need not be concealed, it may be transmitted to the server device 201 without being encrypted. If data that needs to be concealed and data that does not mix among data that are not to be used for search, only the data that needs to be concealed may be encrypted and transmitted to the server device 201.

According to this embodiment, encryption (for example, common key cryptography such as AES) with which the same keyword is always transformed into the same value is employed as a means for generating the deterministic encrypted keyword. However, the keyword need not always be encrypted as far as the same keyword is transformed into the same value and that the original keyword is concealed. Namely, since the original keyword need not be decrypted from the deterministic encrypted keyword, a keyed hash function such as HMAC may be employed.

According to this embodiment, a deterministic encrypted keyword and a trapdoor which is generated probabilistically from a keyword are employed as the search request. If a trapdoor that can be collated with an encrypted keyword (which is generated probabilistically) can be generated from a keyword deterministically, then a single deterministic trapdoor can be imparted with the function of the trapdoor and the function of the deterministic encrypted keyword. This can be realized by, for example, deterministically generating a random number to be used for probabilistic trapdoor generation (by means of, for example, applying the hash function to the keyword). In this case, it is necessary to pay attention because deterministic random number generation may decrease the security of the method.

According to this embodiment, the cache policy determined in the procedure (A. Initial Device Setting) stays unchanged throughout the entire system. Alternatively, during the system operation, the cache policy may be changed by, for example, the administrator of the company that uses the system.

According to this embodiment, in the procedure (B. Transmission and Storage of Search Target Data), each time the server device 201 receives an encrypted keyword, the server device 201 conducts a collation process with respect to each of the trapdoors stored in the search history storage region 213. However, this collation process may be performed as a batch process during, for example, the night (where the server device 201 may have a surplus processing capability). In this case, a collated encrypted keyword and a non-collated encrypted keyword with respect to a trapdoor in the search history storage region 213 may exist in the encrypted keyword storage region 211. Hence, information for distinguishing the two types of keywords is necessary.

According to this embodiment, the registration device 301 assigns a data ID to each piece of data and associates the encrypted keyword and the encrypted data with each other. Alternatively, this may be performed by the server device 201. More specifically, the registration device 301 transmits a set ($c_x$, $d_x$) of an encrypted keyword and encrypted data to the server device 201. Then, the server device 201 assigns a unique data ID ($id_x$) to the set, and stores ($c_x$, $id_x$) to the encrypted keyword storage region 211 and ($id_x$, $d_x$) to the data storage region 212.

According to this embodiment, in the server device 201, the encrypted keyword and the encrypted data are stored separately in the encrypted keyword storage region 211 and data storage region 212, respectively. However, it is possible to manage the encrypted keyword and the encrypted data totally. In that case, the data to be stored will be, for example, as indicated in FIG. 18.

This embodiment indicates an example in which one keyword corresponds to one piece of data. Alternatively, a plurality of keywords may correspond to one piece of data. In that case, for example, the data indicated in FIG. 19 are stored in the encrypted keyword storage region 211. In the example of FIG. 19, encrypted keywords ($c_3$) and ($c_4$) correspond to data associated with ($id_3$). Also, there may be a plurality of types of keywords, as indicated in FIG. 20.

According to this embodiment, the data storage region 212 is utilized to return the encrypted data as the search result. However, if the encrypted data need not be returned, the server device 201 need not have the data storage region 212. For example, the encrypted data may be held by another device, and only the data ID may be returned to enable access to the encrypted data.

According to this embodiment, the registration device 301 and the search device 401 are separate devices. However, in a case where, for example, only the information searcher can register information, the registration device 301 and the search device 401 may be put together into one device. In that case, the encrypted keyword generation key and the like no longer need be open to the public. As a result, the concealed search system 100 can be operated without the risk of giving unsolicited information to the attacker.

According to this embodiment, the cipher key and the private information are stored in the registration cipher key storage region 311 of the registration device 301 and the search cipher key storage region 411 of the search device 401. Alternatively, instead of storing the cipher key and the private information, they may be acquired from the outside when necessary. For example, the cipher key and the private information may be acquired from an IC card or automatically generated from the password or biological information.

According to this embodiment, a single set of registration device 301 and a single set of search device 401 are employed. However, a plurality of registration devices 301 and a plurality of search devices 401 may be employed that can register and search data independently. In that case, if the plurality of search devices 401 share the trapdoor generation key and the deterministic encrypted keyword generation key, different devices can obtain the same search result. On the other hand, if search results are to differ from one device to another using the same search keyword, the different devices must have different trapdoor generation keys as well as different deterministic encrypted keyword generation keys.

Embodiment 2

Embodiment 2 will now be described with reference to FIGS. 26 and 27. Embodiment 2 explains the hardware configuration of a server device 201, a registration device 301, or a search device 401 each being a computer. Since the server device 201, the registration device 301, and the search device 401 are each a computer, the server device 201 will be explained below as an example. The following explanation on the server device 201 applies to the registration device 301 and the search device 401 as well.

Figure 26:
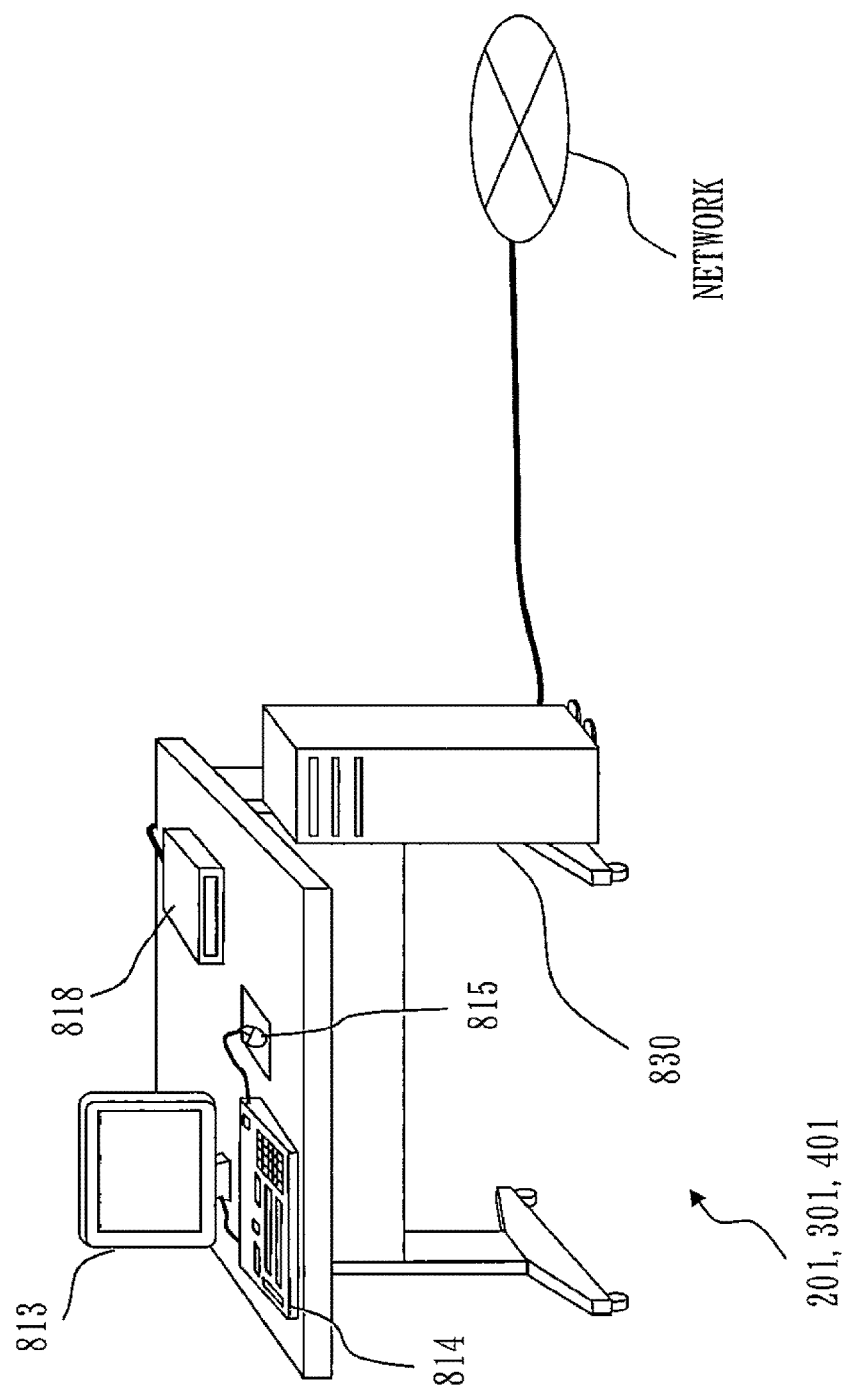
FIG. 26 is an illustration of an example of the appearance of a server device 201 or the like according to Embodiment 2.

FIG. 26 is an illustration of an example of the appearance of the server device 201 which is a computer.

Figure 27:
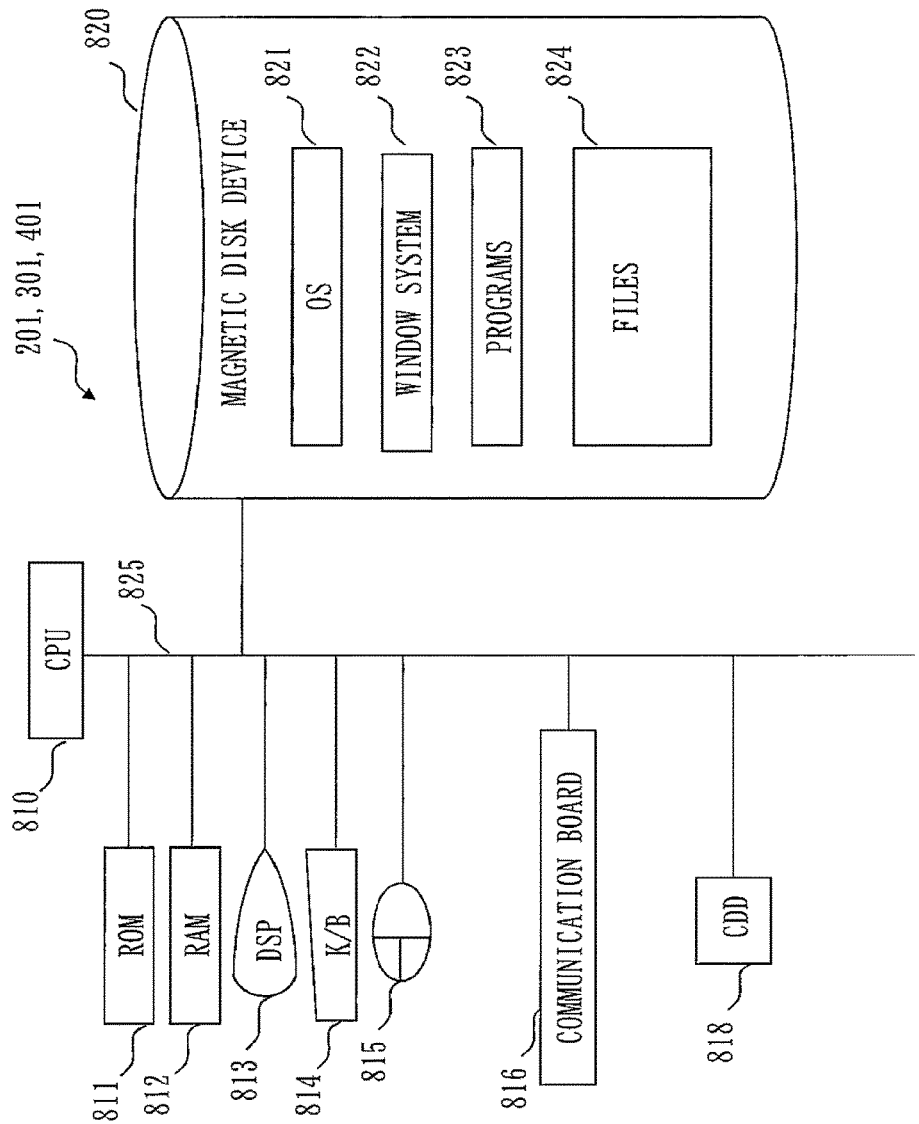
FIG. 27 is a diagram illustrating the hardware configuration of the server device 201 or the like according to Embodiment 2.

FIG. 27 is a diagram illustrating an example of the hardware resources of the server device 201 which is a computer.

Referring to FIG. 26 which illustrates the appearance, the server device 201 includes hardware resources such as a system unit 830, a display device 813 such as a CRT (Cathode Ray Tube) or LCD (Liquid Crystal Display) having a display screen, a keyboard 814 (K/B), a mouse 815, and a compact disk drive 818 (CDD: Compact Disk Drive). These hardware resources are connected via cables and signal lines. The system unit 830 is connected to a network.

In FIG. 27 illustrating the hardware resources, the server device 201 has a CPU 810 (Central Processing Unit) which executes programs. The CPU 810 is connected to a ROM (Read Only Memory) 811, a RAM (Random Access Memory) 812, the display device 813, the keyboard 814, the mouse 815, a communication board 816, the CDD 818, and a magnetic disk device 820 via a bus 825, and controls these hardware devices. In place of the magnetic disk device 820, a storage device such as an optical disc device or flash memory may be employed.

The RAM 812 is an example of a volatile memory. Storage media such as the ROM 811, the CDD 818, and the magnetic disk device 820 are examples of a nonvolatile memory. These memories are examples of a storage device, storage part, storing part, buffer, or storage region. The communication board 816, keyboard 814, and the like are examples of an input part or input device. Also, the communication board 816, display device 813, and the like are examples of an output part or output device. The communication board 816 (communication part) is connected to the network.

The magnetic disk device 820 stores an operating system 821 (OS), a window system 822, programs 823, and files 824. The CPU 810, operating system 821, and window system 822 execute each program of the programs 823.

The programs 823 include a program that executes the function described as a "part" in the description of this embodiment. The program is read and executed by the CPU 810.

Information, data, signal values, variable values, parameters, and the like described as the "checking result", "calculation result", "extraction result", "generation result", or "processing result" in the above explanation of the embodiments are stored in the files 824 as the items of a "file" or "database". The "file" and "database" are stored in a recording medium such as a disk or memory. The information, data, signal values, variable values, and parameters stored in a storage medium such as a disk or memory are read into the main memory or cache memory by the CPU 810 through a read/write circuit, and are used for the operation of the CPU 810 such as extraction, search, look-up, comparison, computation, calculation, processing, output, print, and display. The information, data, signal values, variable values, and parameters are temporarily stored in the main memory, cache memory, or buffer memory during the operation of the CPU such as extraction, search, look-up, comparison, computation, calculation, processing, output, print, and display.

In the explanation of the embodiments described above, the data and signals are recorded in a recording medium such as the memory of the RAM 812, the compact disk of the CDD 818, the magnetic disk of the magnetic disk device 820, an optical disc, a minidisc, a DVD (Digital Versatile Disk), or the like. The data and signals are transmitted online via the bus 825, the signal lines, the cables, or other transmission media.

What is described as a "part" in the description of the above embodiments may be a "means"; or a "step", "procedure", or "process". Namely, what is described as a "part" may be implemented only as software, as a combination of software and hardware, or as a combination of software, hardware, and firmware. The firmware and software are stored, as programs, in a recording medium such as the magnetic disk, flexible disk, optical disk, compact disc, minidisc, or DVD. The program is read by the CPU 810 and executed by the CPU 810. That is, the program causes the computer to function as a "part" mentioned above. Alternatively, the program causes the computer to execute the procedure or method of a "part" mentioned above.

In the above embodiments, for example, the server device 201 is explained. As is apparent from the above explanation, the server device 201 can also be treated as a concealed search program which is to serve as the server device 201. As is apparent from the above explanation, the operation of each "part" of the server device 201 can be treated as a concealed search method.

REFERENCE SIGNS LIST

100: concealed search system; 201: server device; 210: data storage part; 211: encrypted keyword storage region; 212: data storage region; 213: search history storage region; 214: cache policy storage region; 220: checking part; 221: probabilistic encryption collation part; 222: deterministic encryption collation part; 223: cache processing part; 224: registration part; 231: communication part; 301: information registration device; 311: registration cipher key storage region; 321: data encryption processing part; 322: encrypted keyword generating part; 331: communication part; 401: information search device; 411: search cipher key storage region; 421: data decryption processing part; 422: trapdoor generating part; 423: deterministic encrypted keyword generating part; 431: communication part

The invention claimed is:

1. A server device for executing a concealed search in response to a concealed search request, comprising:
   a server-side communication circuit configured to receive from a search device the concealed search request that includes a trapdoor and a deterministic encrypted keyword, the trapdoor being generated from a search keyword in accordance with a probabilistic encryption scheme and used for a matching check with a probabilistic encrypted keyword obtained by encrypting a target keyword of search target data in the concealed search in accordance with the probabilistic encryption scheme, the deterministic encrypted keyword being generated from the search keyword in accordance with a deterministic encryption scheme;
   a search history storage circuit configured to store a search history including storing therein the trapdoor and the deterministic encrypted keyword included in the received concealed search request;
   a data storage circuit configured to store keyword information in which the search target data and the probabilistic encrypted keyword of the search target data are associated with each other; and
   a checking circuit configured to:
   check whether or not a matching deterministic encrypted keyword that matches the deterministic encrypted keyword included in the received concealed search request exists in the search history;
   when it is decided that the matching deterministic encrypted keyword exists, execute the concealed search based on the deterministic encryption scheme using the matching deterministic encrypted keyword existing in the search history; and when it is decided that the matching deterministic encrypted keyword does not exist, execute the concealed search based on the probabilistic encryption scheme using the trapdoor included in the received concealed search request and the probabilistic encrypted keyword of the keyword information stored in the data storage circuit.

2. The server device according to claim 1, further comprising:

a policy storage circuit configured to store a history policy on whether or not to store the trapdoor and the deterministic encrypted keyword included in the received concealed search request to the search history; and a cache processing circuit configured to, when it is decided by the checking circuit that the matching deterministic encrypted keyword does not exist in the search history storage circuit, decide whether or not to store the trapdoor and the deterministic encrypted keyword included in the received concealed search request to the search history in accordance with the history policy of the policy storage circuit.

3. The server device according to claim 2, wherein the checking circuit is configured to, when it is decided that the matching deterministic encrypted keyword does not exist in the search history, execute a matching check between the trapdoor that is included in the received concealed search request the probabilistic encrypted keyword of the keyword information stored in the data storage circuit, wherein the policy storage circuit includes an association policy on, when the checking circuit detects the probabilistic encrypted keyword which matches the received trapdoor, in the data storage circuit by the matching check, whether or not to associate the deterministic encrypted keyword included in the received concealed search request with the probabilistic encrypted keyword detected, and wherein the cache processing circuit, when the checking circuit detects the probabilistic encrypted keyword which matches the received trapdoor, in the data storage circuit by the matching check, decides whether or not to associate the deterministic encrypted keyword included in the received concealed search request with the detected probabilistic encrypted keyword of the keyword information in accordance with the association policy.

4. The server device according to claim 1, wherein the server-side communication circuit is configured to receive the search target data and the probabilistic encrypted keyword of the search target data from a registration device that requests registration of the search target data, the server device further comprises a registration circuit configured to associate the search target data with the probabilistic encrypted keyword from the registration device received by the server-side communication circuit, and to store the search target data and the probabilistic encrypted keyword to the data storage circuit, and the checking circuit is configured to execute a matching check between the probabilistic encrypted keyword that matches the trapdoor included in the received concealed search request and the search history stored in the search history storage circuit, and when a stored trapdoor that matches the probabilistic encrypted keyword is detected in the matching check, associates a corresponding deterministic encrypted keyword that is stored in association with the detected trapdoor with the probabilistic encrypted keyword stored in the data storage circuit.

5. The server device according to claim 1, wherein the data storage circuit is further configured to store in the keyword information a previously received deterministic encrypted keyword included in a previously received concealed search request in association with a probabilistic encrypted keyword of the keyword information that matches a previously received trapdoor included in the previously received concealed search request.

6. A non-transitory computer-readable recording medium in which stores a concealed search program, which when executed by a server device, cause the server device to perform a method, the method comprising;

receiving from a search device a concealed search request that includes a trapdoor and a deterministic encrypted keyword, the trapdoor being generated from a search keyword in accordance with a probabilistic encryption scheme and used for a matching check with a probabilistic encrypted keyword obtained by encrypting a target keyword of search target data in the concealed search in accordance with the probabilistic encryption scheme, the deterministic encrypted keyword being generated from the search keyword in accordance with a deterministic encryption scheme;

storing a search history including storing therein the trapdoor and the deterministic encrypted keyword included in the received concealed search request;

storing keyword information in which the search target data and the probabilistic encrypted keyword of the search target data are associated with each other;

checking whether or not a matching deterministic encrypted keyword that matches the deterministic encrypted keyword included in the received concealed search request exists in the search history;

when it is decided that the matching deterministic encrypted keyword exists, executing a concealed search in response to the received concealed search request based on the deterministic encryption scheme using the matching deterministic encrypted keyword existing in the search history; and when it is decided that the matching deterministic encrypted keyword does not exist, executing the concealed search in response to the received concealed search request based on the probabilistic encryption scheme using the trapdoor included in the received concealed search request and the probabilistic encrypted keyword of the keyword information.

7. The non-transitory computer-readable recording medium according to claim 6, wherein the method further comprises:

storing in the keyword information a previously received deterministic encrypted keyword included in a previously received concealed search request in association with a probabilistic encrypted keyword of the keyword information that matches a previously received trapdoor included in the previously received concealed search request.

8. A concealed search system comprising:

a search device configured to transmit a concealed search request; and a server device configured to receive the concealed search request from the search device, and to execute a concealed search in response to the concealed search request, wherein the search device includes:

a search-side transmission circuit configured to transmit the concealed search request that includes a trapdoor and a deterministic encrypted keyword the trapdoor being generated from a search keyword in accordance with a probabilistic encryption scheme and used for a matching check with a probabilistic encrypted keyword obtained by encrypting a target keyword of search target data in the concealed search in accordance with the probabilistic encryption scheme, the deterministic encrypted keyword being generated from the search keyword in accordance with a deterministic encryption scheme, and the server device includes:

a server-side communication circuit configured to receive the concealed search request that includes the trapdoor and the deterministic encrypted keyword, the concealed search request being transmitted by the search-side transmission circuit;

a search history storage circuit configured to store a search history including storing therein the trapdoor and the deterministic encrypted keyword included in the received concealed search request;

a data storage circuit configured to store keyword information in which the search target data and the probabilistic encrypted keyword of the search target data are associated with each other; and a checking circuit configured to:
check whether or not a matching deterministic encrypted keyword that matches the deterministic encrypted keyword included in the received concealed search request exists in the search history;

when it is decided that the matching deterministic encrypted keyword exists, execute the concealed search based on the deterministic encryption scheme using the matching deterministic encrypted keyword existing in the search history; and when it is decided that the matching deterministic encrypted keyword does not exist, execute the concealed search based on the probabilistic encryption scheme using the trapdoor included in the received concealed search request and the probabilistic encrypted keyword of the keyword information stored in the data storage circuit.

9. The concealed search system according to claim 8, wherein the data storage circuit of the server device is further configured to store in the keyword information a previously received deterministic encrypted keyword included in a previously received concealed search request in association with a probabilistic encrypted keyword of the keyword information that matches a previously received trapdoor included in the previously received concealed search request.

* * * * *